(12) United States Patent
Joyner

(10) Patent No.: US 11,570,957 B2
(45) Date of Patent: Feb. 7, 2023

(54) ADJUSTABLE, CONTROLLED RATE PLANT WATERING DEVICE

(71) Applicant: Keith Alan Joyner, Richardson, TX (US)

(72) Inventor: Keith Alan Joyner, Richardson, TX (US)

( * ) Notice: Subject to any disclaimer, the term of this patent is extended or adjusted under 35 U.S.C. 154(b) by 73 days.

(21) Appl. No.: 17/248,025

(22) Filed: Jan. 5, 2021

(65) Prior Publication Data

US 2022/0210988 A1 Jul. 7, 2022

(51) Int. Cl.
*A01G 27/04* (2006.01)
*A01G 27/06* (2006.01)

(52) U.S. Cl.
CPC .................................... *A01G 27/04* (2013.01)

(58) Field of Classification Search
CPC ...... A01G 27/04; A01G 27/06; A01G 27/006; A01G 29/00; A01G 9/124
See application file for complete search history.

(56) References Cited

U.S. PATENT DOCUMENTS

| | | | | |
|---|---|---|---|---|
| 880,968 A * | 3/1908 | Bunker | .................. | A01G 27/04 47/81 |
| 2,491,124 A * | 12/1949 | Martin | ................... | A01G 29/00 405/36 |
| 3,576,088 A * | 4/1971 | Arca | ...................... | A01G 27/04 239/57 |
| 4,089,133 A * | 5/1978 | Duncan | .................. | A01G 29/00 47/48.5 |
| 4,115,951 A * | 9/1978 | Becker | ................... | A01G 27/06 220/86.1 |
| 4,404,767 A * | 9/1983 | Enrich | ................... | A01G 27/04 47/81 |
| 4,782,627 A * | 11/1988 | Hauk | ..................... | A01G 27/06 47/81 |
| 4,805,343 A * | 2/1989 | Patterson | ........... | B01D 67/0088 47/79 |
| 5,443,544 A * | 8/1995 | Azoulay | .............. | A01G 27/006 47/81 |

* cited by examiner

*Primary Examiner* — Monica L Perry

(57) ABSTRACT

A device facilitating water or liquid fertilizer distribution to a plant growth medium by wicking from a tube that accepts a separate and removable liquid reservoir. The tube is closed at the bottom and accepts the outlet of the external reservoir. The tube is inserted into the top surface of the plant growth medium so that the wick emerges from the tube above the top of the plant growth medium and contacts it. As liquid is transferred by the wick, the liquid level in the tube drops below the opening of the reservoir outlet, allowing air to enter the reservoir from the bottom and more water to flow from the reservoir into the tube. The characteristics of the wicks can be adjusted by the user to change the water flow rate and water distribution pattern to accommodate the needs of individual plants.

14 Claims, 6 Drawing Sheets

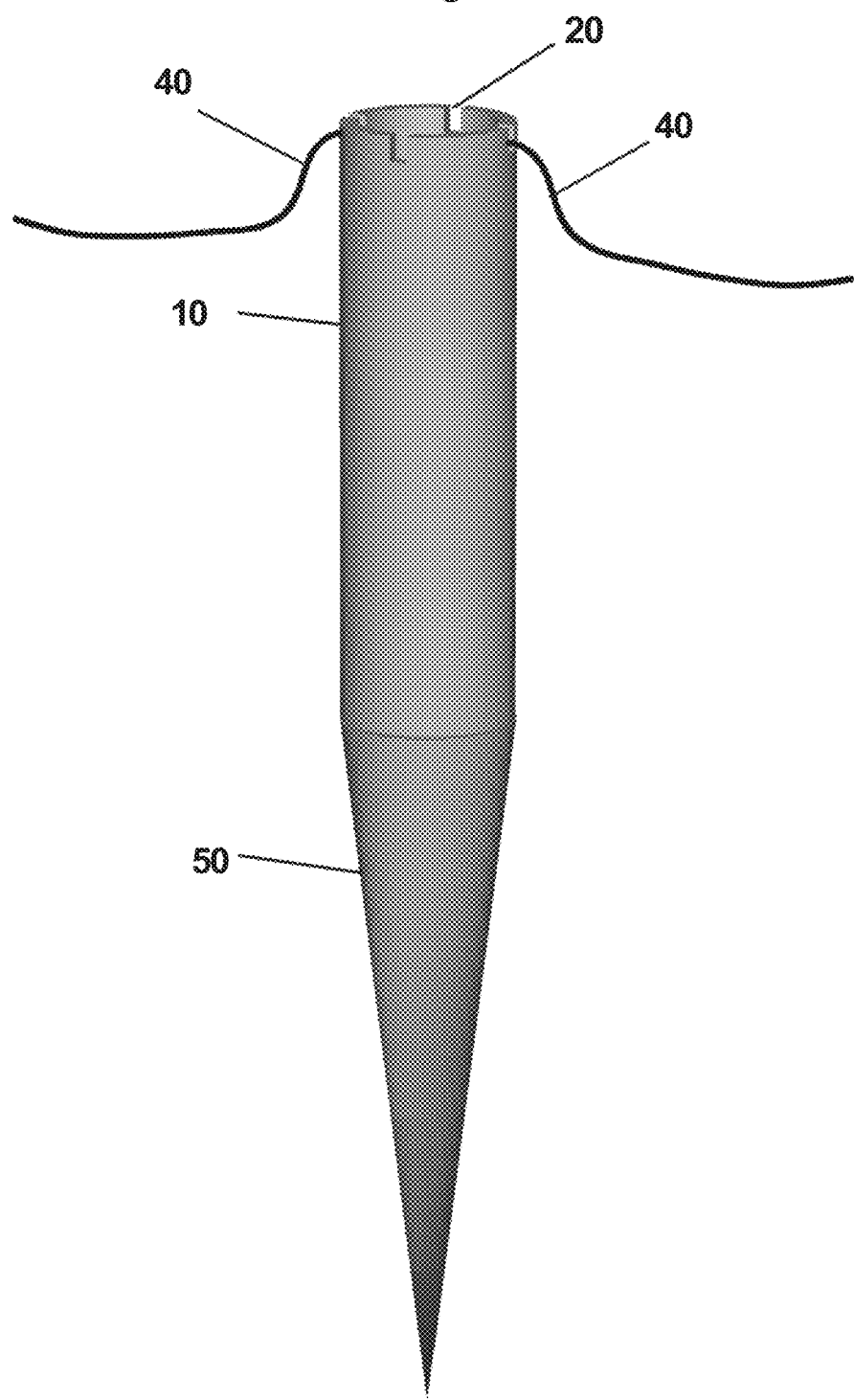

ADJUSTABLE, CONTROLLED RATE PLANT WATERING DEVICE

The following is a tabulation of some prior art that presently appears relevant:

U.S. Patents

| Pat. No. | Kind Code | Issue Date | Patentee |
|---|---|---|---|
| 8,893,432 | B2 | 2014 Nov. 25 | Asal |
| 8,567,123 | B2 | 2013 Oct. 29 | Friesen |
| 8,381,441 | B2 | 2013 Feb. 26 | Altendorfer, et al. |
| 7,845,110 | B2 | 2010 Dec. 7 | Amsellem |
| 7,681,356 | B2 | 2010 Mar. 23 | Sheldrake, et al. |
| 7,171,783 | B1 | 2007 Feb. 6 | Fidotti |
| 7,082,715 | B2 | 2006 Aug. 1 | De Winter |
| 6,418,663 | B1 | 2002 Jul. 16 | Smith |
| 5,446,994 | | 1995 Sep. 5 | Chou |
| 5,329,729 | | 1994 Jul. 19 | Liang |
| 4,782,627 | | 1988 Nov. 8 | Hauk |
| 4,115,951 | | 1978 Sep. 26 | Becker, et al. |
| 2,799,121 | | 1957 Jul. 16 | Modeweg |
| 2,747,332 | | 1956 May 29 | Morehouse |
| 1,400,628 | | 1921 Dec. 20 | Rudolph |
| 689,248 | | 1901 Dec. 17 | Timm |

Foreign Patent

| Foreign Doc. Nr. | Country Code | Kind Code | Pub. Date | App or Patentee |
|---|---|---|---|---|
| 2,252,806 | FR | A3 | 1975 Jun. 27 | Dehaye |

DESCRIPTION

Field of the Invention

The invention generally relates to plant husbandry and specifically to watering or feeding plants.

BACKGROUND OF THE INVENTION

Supplying water to indoor plants has historically required significant time and attention on the part of a caregiver. In the simplest approach, the caregiver will manually water the plant growth medium from a container, such as a watering can. Though this is simple and inexpensive, there are several drawbacks. This approach often requires frequent attention and the required frequency of watering and the quantity of water needed will vary from one plant to another. This method can result in spillage due to overflowing the plant container and saucer—clearly undesirable for indoor plants. Manual watering can also be required as frequently as every few days. This presents a problem in the case of extended caregiver absence. Beyond this approach, there are automatic water distribution systems but these are complex and expensive. A spray watering device is not practical indoors and water distribution piping or tubing is unsightly.

Some prior art solutions to these problems have provided a relatively large reservoir of water that communicates with the plant growth medium. However, in soil, as moisture increases beyond a certain level, oxygen content generally decreases. An imbalance between oxygen and water will reduce or even stop photosynthesis in many house plants. Additionally, a plant growth medium that is kept constantly wet will become oxygen deficient or even septic. This will likely result in damage to or loss of the plant. Therefore, adjustment of the water transfer rate from the reservoir is required to both provide adequate water to the plant and avoid long term water saturation of the growth medium. This is a significant problem for watering systems that involve watering from a large reservoir located at the bottom of the pot. A device of this type is shown in U.S. Pat. No. 8,381,441 issued Feb. 26, 2013 to G. Altendorfer et al. Also, the water transfer rate of such systems is difficult to adjust because of the location of the wicks that determine the water transfer rate. These wicks are buried at or near the bottom of the plant growth medium and require removal of the plant in order to change their type, number, length or location. It is also difficult to determine how much water remains in the reservoir. Also, a special purpose pot is needed, limiting the design choices available to the gardener and leading to higher cost. A variant of this approach is shown in U.S. Pat. No. 8,893,432 issued Nov. 25, 2014 to B. Asal. In this system, the wick is routed outside the pot to the top surface of the plant growth medium. This makes it easier to adjust the type, number, length or location of the wicks but the wicks are routed through visible tubing on the outside of the pot, creating a less desirable aesthetic and increasing cost. This approach also suffers from the other disadvantages of U.S. Pat. No. 8,381,441, given above: difficulty in determining water level, higher cost and limited design options. Since the water level is difficult to determine there is also greater risk that the reservoir will overflow during filling.

Another attempt to solve the plant watering problem is to provide a side reservoir as shown in U.S. Pat. No. 5,446,994 issued Sep. 5, 1995 to W. Chou. This patent describes a top side reservoir using water transfer by wick into the plant growth medium. This system also requires a special pot. Such a pot suffers from the cost and aesthetic limitations noted previously. The external reservoir also increases the effective pot size with no increase in the area available for plants. This side mounted reservoir is also undesirable aesthetically. In addition to these shortcomings, U.S. Pat. No. 5,446,994 has an open reservoir. Such a reservoir would result in significantly more water loss due to evaporation directly from the reservoir than a reservoir with a lid or hermetic cap. Adding a lid to the reservoir would further increase cost.

Another prior art attempt is shown in U.S. Pat. No. 6,418,663 issued Jul. 16, 2002 to W. Smith. It uses water distribution by dripping or wicking from a top side reservoir that is mounted on the rim of an existing pot. It suffers from most of the same disadvantages as U.S. Pat. No. 5,446,994 above. In addition, the outside diameter of the pot used must be compatible with the inner diameter of the reservoir. This would significantly reduce the number of pots that would be usable with this system, thus increasing cost and decreasing design options. While one embodiment does show a lid over the primary reservoir with a secondary hermetic reservoir in it that would decrease evaporative loss, that option would further increase cost and the inconvenience in refilling the reservoir. In addition, there are aesthetic drawbacks to this approach. This lid also makes it less convenient to determine how much water remains in the reservoir. In addition, adjusting the flow rate for the drip distribution of water into the plant growth medium in those embodiments is more difficult and less reliable, being dependant on reservoir water level and flow impedance of the drip emitter.

Another potential solution to the problems of watering indoor plants noted above is described in U.S. Pat. No. 689,248, issued Dec. 17, 1901 to R. Timm. This patent describes a device that has a hermetic top reservoir and a stem open at the bottom that is inserted into the plant growth medium. Devices similar in concept to these were widely advertised in the late 20$^{th}$ and early 21$^{st}$ centuries and are still widely available commercially as of this writing. An example of this prior art device is shown in FIG. 1. They have been referred to as Aqua Globes® or watering globes— the latter name being used in this discussion. Such devices have a hermetic bulb on top with an extended stem that is designed to be inserted into the plant growth medium. They are usually made of glass. Those currently sold have longer stems than those illustrated by Timm so that the globe normally sits significantly above the surface of the plant medium and thus occupies little of the pot's top surface area. The globe is filled with water and inserted into the plant growth medium. The release of water from the globe depends on the admission of air into the globe, allowing the release of a limited quantity of water into the plant growth medium for each admission of air. Although the longer stem in current versions of these devices does reduce the surface area occupied by these watering globes, it leads to other problems, as discussed below.

These globes are purported to facilitate watering by eliminating the risk of under watering and over watering. However, these advantages are often not realized in practice. I have found that the water transfer rate of these globes depends on the porosity of the plant growth medium into which it is inserted. A porous plant growth medium will allow rapid water dispersal away from the tip of the watering globe. This allows relatively rapid air entry into the globe and consequent rapid water outflow from it that can cause the globe to empty too quickly. This can cause the pot's saucer to overflow. Moreover, I have found that plant growth medium with a higher clay content will be less porous and can cause the tip of the watering globe to become clogged. This inhibits adequate water transfer and results in under watering. In addition, I have found that the watering globe can sag to one side in the pot, since it is only supported by the plant growth medium at the relatively narrow end of the neck. This sagging occurs because the moist growth medium must support the significantly larger filled globe that is elevated above its surface, creating a significant upsetting torque, leading to a significant tilt of the watering globe.

Also, the capacities of the globes are limited to a relatively small range that is available in the market. This capacity is usually approximately one half liter or less. The maximum practical size of a globe inserted directly into a plant growth medium is constrained by the limitations of the mechanical support by the plant growth medium discussed above. Thus, weekly or more frequent refilling of the globe is often required. Though this frequency would not ordinarily be a problem, it becomes one if care must be provided to a relatively large number of plants or it the plants must remain unattended for a significant period of time while the caregiver is away. Additionally, I have found that the water from a watering globe moistens the plant growth medium only below and nearby its tip. This will often result in uneven distribution of the water among different plants within a pot or require the use of multiple globes for a single pot. Furthermore, since the open end of the globe is inserted into the plant growth medium, I have found that algae can find its way into the watering globe. Its growth there produces a non-uniform and unsightly appearance. When conditions are just right, these globes can work acceptably well by themselves but the above mentioned problems are common and significantly limit the globes' usefulness and appeal.

Another example of prior art is French patent FR 2,252, 806 issued Jun. 27, 1975 to P. Dehaye. What is claimed is a storage container inserted into the plant growth medium that is used to store water that is in turn distributed to the plants by wicks. The element placed in the plant growth medium does not have the shape and stability needed to support a long stem watering globe or other reservoir of significant height. Thus, it could not be used with commercially available watering globes (FIG. 1—Prior Art) or other similar reservoirs that may become available. Devices of this type can only support shorter and thus lower capacity or larger surface area reservoirs. Also, though this invention employs water transport by wicking, the wicks emerge below the water level in the reservoir. This means that water in the reservoir of this invention will flow around the wicks at these openings and directly into the growth medium, leading to loss of watering rate control and to likely over-watering. In this device, the water transfer rate is not determined by wicking alone but also by this additional, difficult to control leakage. Also, this design does not provide easy modification of the number of wicks, since the number and size of these openings is set by its design. Any holes that are not occupied by wicks will transmit excessive volumes of water to the growth medium unless they are individually plugged. Algae can also find its way into the elevated secondary reservoir and grow there, causing it to become unsightly if it is transparent.

Another prior art device is shown in U.S. Pat. No. 7,082,715 issued Aug. 1, 2006 to K. De Winter. It employs a hermetic reservoir that is set over a base that is in turn placed on the surface of the plant growth medium. Water is transferred from the hermetic reservoir to the intermediate reservoir in the base. From there, it is transferred to the growth medium by wicking, employing rigid wicks that connect the intermediate reservoir and the growth medium. Because of its complexity, it is comparatively expensive and occupies significant space on the surface of the growth medium, reducing the space available for plants. The wick configuration also means that it waters the area only directly beneath the two ends of the device. The capacity of the primary reservoir is fixed by its design and manufacture, limiting aesthetic options, increasing cost and limiting the maximum time that the plant can be left unattended and still deliver water to the plant. These and other limitations diminish the usefulness of this device.

It is clear that many have tried to create a solution to the problem of unattended plant watering and all the attempts have failed to see commercial success with the exception of the watering globe, which has had some success. The reasons for these failures are outlined above. Though the watering globe has seen reasonable sales, it has significant shortcomings and limitations, as also noted above. The device described below addresses these shortcomings in a cost effective, practical and aesthetically pleasing manner.

SUMMARY

The first embodiment of this device comprises a tube that is open at its upper end and closed further down, having an inside diameter somewhat larger than the outside diameter of a typical watering globe extension, providing significantly improved stability of the combination in the growth medium. The interior diameter of the tube should be close enough to the outside diameter of the watering globe extension to provide stability of the globe when placed in the tube. This embodiment is shown in FIG. 2. The tube is inserted into the plant growth medium in such a manner that its open end is above the level of the plant growth medium. One end of at least one wick is inserted into the tube. This wick originates in the bottom region of the inside of the tube where it can be secured by an optional retaining device to help keep the wick in place when the watering globe is removed. The wick then passes out of the tube above the top of the plant growth medium. Optional notches or slots at the top of the tube are shown that can also improve the security of the wicks. At least a portion of the other end of the wick is buried in the plant growth medium. The tip of a filled watering globe or the outlet of another filled hermetic reservoir is inserted into the tube. A cross sectional view of the tube is shown in FIG. 2A.

As discussed above, the design of the watering globe is such that water will not flow out of the globe unless air is admitted through its tip. This prevents a large volume of water from rapidly flowing into the tube and overflowing the pot. When the globe is inserted, water fills the tube to just above the tip of the globe. It is transported to the plant growth medium by wicking alone. When the water level in the tube falls below the tip of the globe, more air can enter the globe, allowing more water to flow into the tube. This way, the water level in the tube varies up and down only modestly. Water transfer is mediated by wicking action, not by air inflow from the plant growth medium into the watering globe. Since the water is drawn from the tube by capillary action of the wicks, the transfer rate is effectively constant for a given wick configuration, plant growth medium composition and water demand by the plant. This allows the water transfer rate to be controlled by adjusting the number, size, composition and/or length of the wicks. Since the delivery ends of the wicks are normally positioned near the top surface of the plant growth medium, the caregiver can easily change the configuration of the wicks. Note that the water storage is in the external watering globe or other external reservoir, not in the tube itself. The tube provides support for the reservoir and a convenient means of transferring water from the external reservoir to the wicks, limiting the transfer rate to the fluid conductivity of the wicks.

A second embodiment has an extension below the lower closure of the tube. This embodiment is shown in FIG. 3. The operation is as for the first embodiment but the extension from the bottom of the tube provides additional stability for support of a larger watering globe.

A third embodiment of the device has a plate fixed to the bottom end of the tube having an area significantly greater than the cross sectional area of the tube itself. Along with the tube's other advantages, this embodiment provides significantly improved stability for pots that are too shallow to accept a tube with a significant extension. The bottom plate also allows the use of a watering globe in a pot that could not otherwise support one due to its shallow depth. An illustration of this embodiment is shown in FIG. 4.

In addition to permitting easy adjustment of the water transfer rate, the use of this device allows the caregiver to adjust the water distribution pattern by changing the placement of the wicks. By positioning the wicks appropriately, the water distribution can be made more uniform across the plant growth medium or increased in some areas compared to others to meet the needs of individual plants. By using a sleeve that is impervious to water around part of the length of a wick, one can apply water preferentially to some parts of the plant container that are away from the tube while still using a single tube. By using a sleeve, water can be transported across portions of the plant growth medium without absorption and then absorbed from the portion of the wick outside the sleeve and in contact with the plant growth medium. Thus, water can be routed to remote locations. This allows watering large or long, narrow pots with a single tube. Placing the wicks in sleeves also makes it feasible to cultivate plants with very different water requirements in the same container (succulents along with non-succulents, e.g.), since the water can be transported inside the sleeve to be absorbed elsewhere, allowing some portions of the plant growth medium to be kept relatively dry while other portions are kept normally moist.

Since the tube and wicks remain in place, the reservoir can easily be removed, refilled and replaced in the tube. Since almost all watering globes are at least partly transparent, the water level in the globe can be assessed readily. The caregiver can easily replace the globe with another reservoir with a different design, color or capacity. One of the claims describes a new use of a tip attached to a bottle, forming a larger capacity reservoir for plant nourishment. The stability of the tube/globe combination is superior to that of a globe inserted directly into the plant growth medium, due to the tube's larger diameter and/or greater length. The second embodiment of the device has an extension from the lower end of the tube into the plant growth medium and the third embodiment has a plate fixed to the bottom of the tube to further improve stability.

Because of this stability, any of these embodiments make it feasible to use a larger reservoir. This would allow a supply of water sufficient for an extended period of time (during a vacation, e.g.) without human intervention or requiring the use of a complex and costly electronic or electrical control system. Upon return of the caregiver, the larger reservoir is easily exchanged for the normal one without the need to change the tube or wick arrangement.

Aesthetic considerations are important in most plant culture endeavors. Many prior art approaches to plant watering employ a special purpose pot—one with a built in reservoir, e.g. The disclosed device could be used with almost any pot—leading to many more design options for the plant container. Also, with this device, the user would be able to make the decision of which globe or reservoir to use based on aesthetic and practical factors. In addition to the prior art watering globe, a fully functional reservoir could be made in the form of a mushroom, rock, miniature tree, building, animal, monument, statue or any of a host of other designs. The reservoir could have a design theme such as an oriental theme for a bonsai dish garden, e.g.

In addition to its use with indoor plants, this tube can be used to re-distribute water in a drip irrigation system, which is normally used in outdoor watering. In drip systems, water is deposited directly beneath the drip emitter. Using this device, an emitter can be placed in the tube in place of a reservoir to provide water for distribution. The water can be easily spread over a significantly larger area than by using an emitter alone, reducing the number of drip emitters needed to provide for multiple plants or larger plants and improving watering uniformity.

There remains the question of whether the disclosed device is unobvious. The hermetic reservoir is shown in U.S. Pat. No. 689,248, issued Dec. 17, 1901 to R. Timm. The use of a wick in the distribution of water to a plant medium was shown in U.S. Pat. No. 1,400,628, issued Dec. 20, 1921 to A. Rudolph. Limited and problematic examples of the combination of these two concepts in the prior art are French patent FR 2,252,806 issued Jun. 27, 1975 to P. Dehaye and U.S. Pat. No. 7,082,715 issued Aug. 1, 2006 to K. De Winter. These approaches are discussed in preceding sections, along with their shortcomings. Devices of the type described by Dehaye or De Winter have not achieved commercial success, likely because of their inherent disadvantages and limitations. The herein disclosed device represents a new, improved way of using a removable water reservoir, providing significant advantages. It provides a novel combination of an inexpensive, commonly available hermetic reservoir and wick controlled distribution of water. The combination outlined here provides flexibility and other advantages not seen in prior art and produces new, synergistic and unexpected results. The fact that no combination of these two elements in a manner comparable to the disclosed device has been put forward in the almost 100 years since the issuance of Rudolph's patent is clear evidence that the combination is nonobvious.

The benefits of this device over prior art include:

- It can be used with almost any pot—a wide variety of colors, designs, shapes, materials and sizes
- It provides greater stability of the reservoir verses insertion of a watering globe directly into the medium (the globe is unlikely to sag to one side using this device for support)
- For reservoirs that are at least partially transparent or translucent, the level of water remaining in the reservoir can be readily seen.
- Its use avoids clogging that can occur with insertion of globes directly into the medium.
- Its use avoids overly rapid emptying of the globe (and subsequent overflow) that can occur when the medium is especially porous.
- The watering rate can be adjusted to meet the plant's needs by adding or removing wicks or by using different sizes or compositions of wicks or different wick materials without re-potting the plant(s).
- It keeps the medium from soiling the inside of the globe (and thus avoids mold or algae growth there).
- It allows the use of different sized reservoirs—providing for long term unattended watering. Reservoirs other than watering globes can also be used, as long as the outlet tip of the reservoir will fit into the tube. A remote reservoir can be used, with its outlet comprising tubing having a tip that fits into the herein disclosed tube.
- It permits use of different types of reservoirs (such as bottles, decorative glass, miniatures, etc.—when fitted with an appropriate tip).
- It can be used as the base of a decorative item designed to hold water (a pagoda, e.g.).
- Its water distribution is from the top down, as is the case in many plant environments in nature, allowing water application to a large portion of the entire pot volume while providing aeration of the medium.
- Water can be distributed more uniformly across the pot or concentrated more around some plants than others.
- It leaves the top of the pot relatively unencumbered since the reservoir normally sits above the pot rim—allowing for more plants, decorative materials or structures on the top surface of the medium.
- The water transport is entirely passive once the reservoir is inserted (no external power source, control devices, or additional plumbing are needed).
- It has an aesthetically pleasing appearance—an inconspicuous tube for use with a variety of possible reservoirs.
- It can be easily added to a pot even if there are already large established plants growing in it.

In the preceding discussion, reference is made to the transfer of water to a plant growth medium. However, it is explicitly intended that the device can be used with any aqueous solution including, e.g., fertilizer solution. It can also be used in applications other than house plants such as outdoor plants, drip irrigation, greenhouse plants, seedlings, etc. The water source may be a commercially available watering globe or any essentially rigid container that is closed at the upper end and has an extension with an opening at the lower end. The water source may also be positioned outside the pot, with tubing connected to its output and routed to terminate in a tip that will fit into the herein described tube. This arrangement can provide much greater capacity for extended absences of the caregiver. In this case, said tubing must slope continuously downward from the reservoir to the herein described tube to allow air to rise into the reservoir.

BRIEF DESCRIPTION OF THE DRAWINGS

Figures are attached illustrating the prior art watering globe and the disclosed device in perspective and cross sectional views.

FIG. 3 shows the watering device in accordance with a second embodiment.

DRAWINGS—REFERENCE NUMERALS

Figure 1:
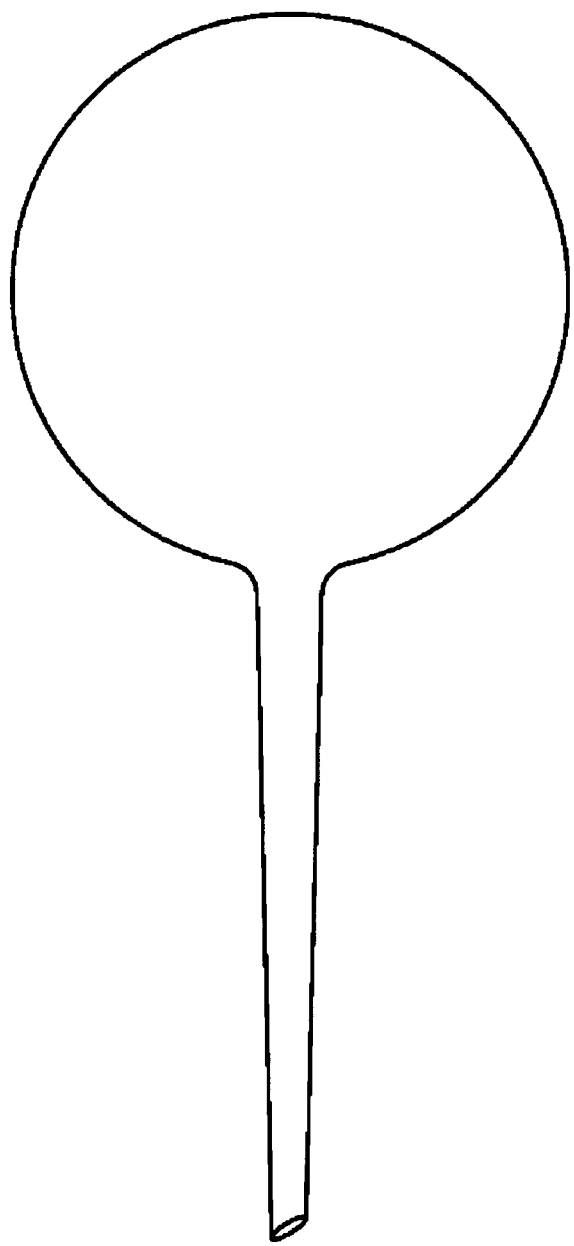
FIG. 1 shows a prior art watering globe device.

10 body of tube
20 wick retaining notch
30 tube extension
40 wick
50 wick retaining device
70 bottom plate
80 tip
90 securing device DETAILED DESCRIPTION—FIGS. 1, 2, 2a, 3 AND 4

FIG. 1 shows a commercially available prior art watering globe that works well with the disclosed device. Note that it is hermetic (air tight) on top and has a rigid extension with an opening at the bottom.

Figure 2:
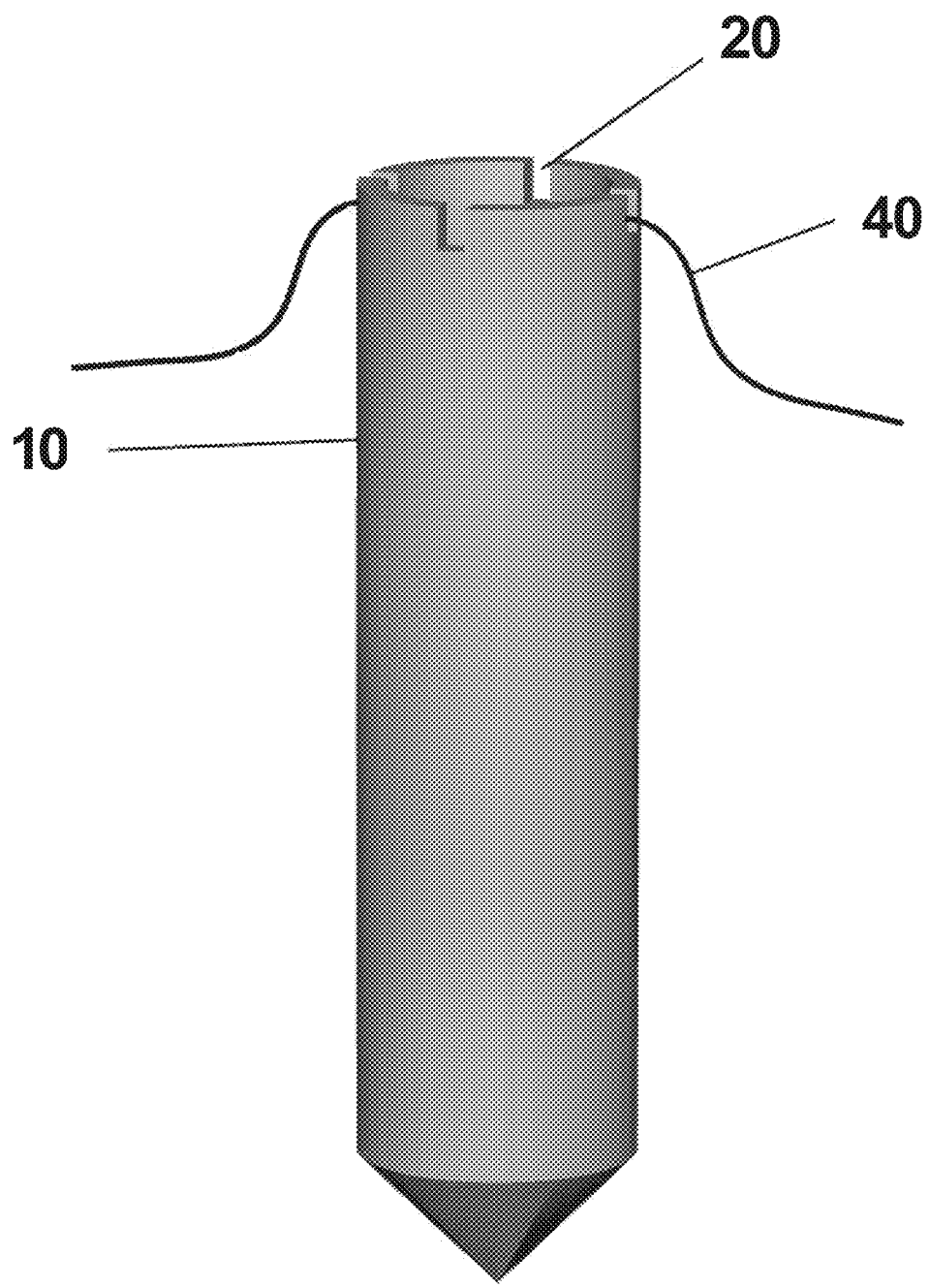
FIG. 2 shows the device in accordance with the first embodiment.

FIG. 2 shows the first embodiment of the disclosed device in perspective view. The tube (10) is inserted into the plant growth medium. One end of at least one wick (40) is inserted into the tube. The wick (40) can be routed through optional notches (20) with its other end inserted into the plant growth medium. In use, the tip of a separate, filled, prior art watering globe or other reservoir can be inserted into the tube (10), providing water to the plants, via the wick (40).

Figure 2A:
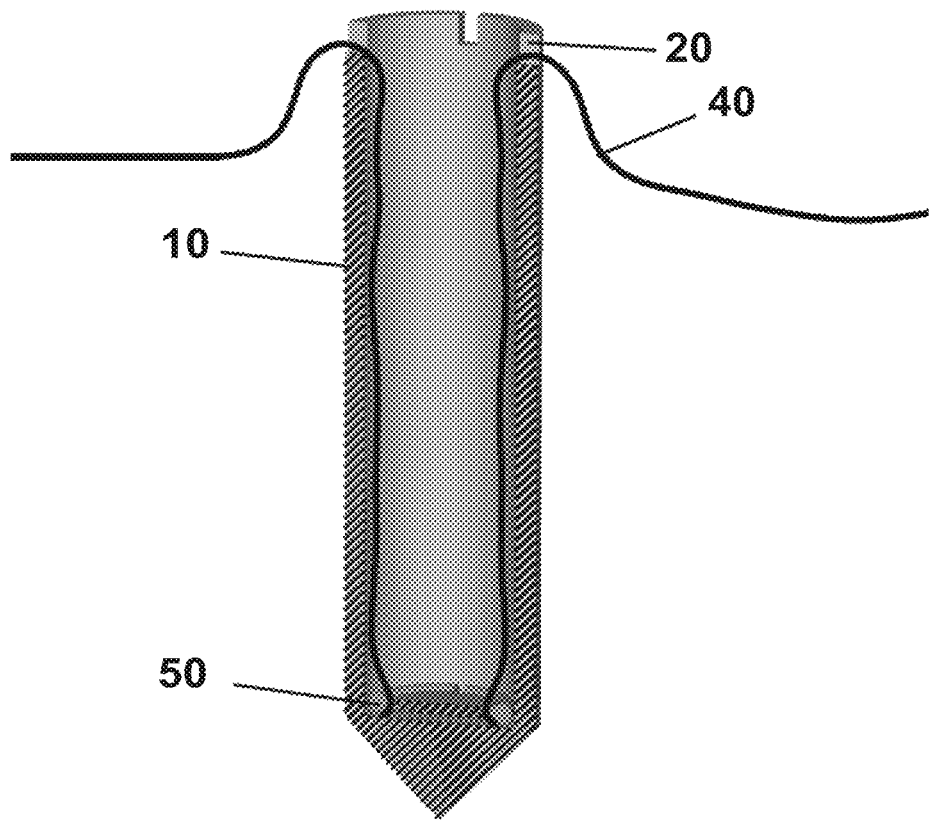
FIG. 2a shows the watering device in cross section in accordance with the first embodiment.

FIG. 2a shows the first embodiment of the disclosed device in cross section view. The tube (10) is inserted into the plant growth medium. One end of at least one wick (40) is inserted into the tube and optionally held in place by a retaining device (50). The wick (40) can be routed through optional notches (20) with its other end inserted into the plant growth medium. In use, the tip of a separate, filled, prior art watering globe or other reservoir can be inserted into the tube, providing water to be conveyed to the plants.

FIG. 3 shows a second embodiment with the tube (10), optional notches (20), at least one wick (40) and a tube extension (30). In use, a reservoir is inserted into the tube.

Figure 4:
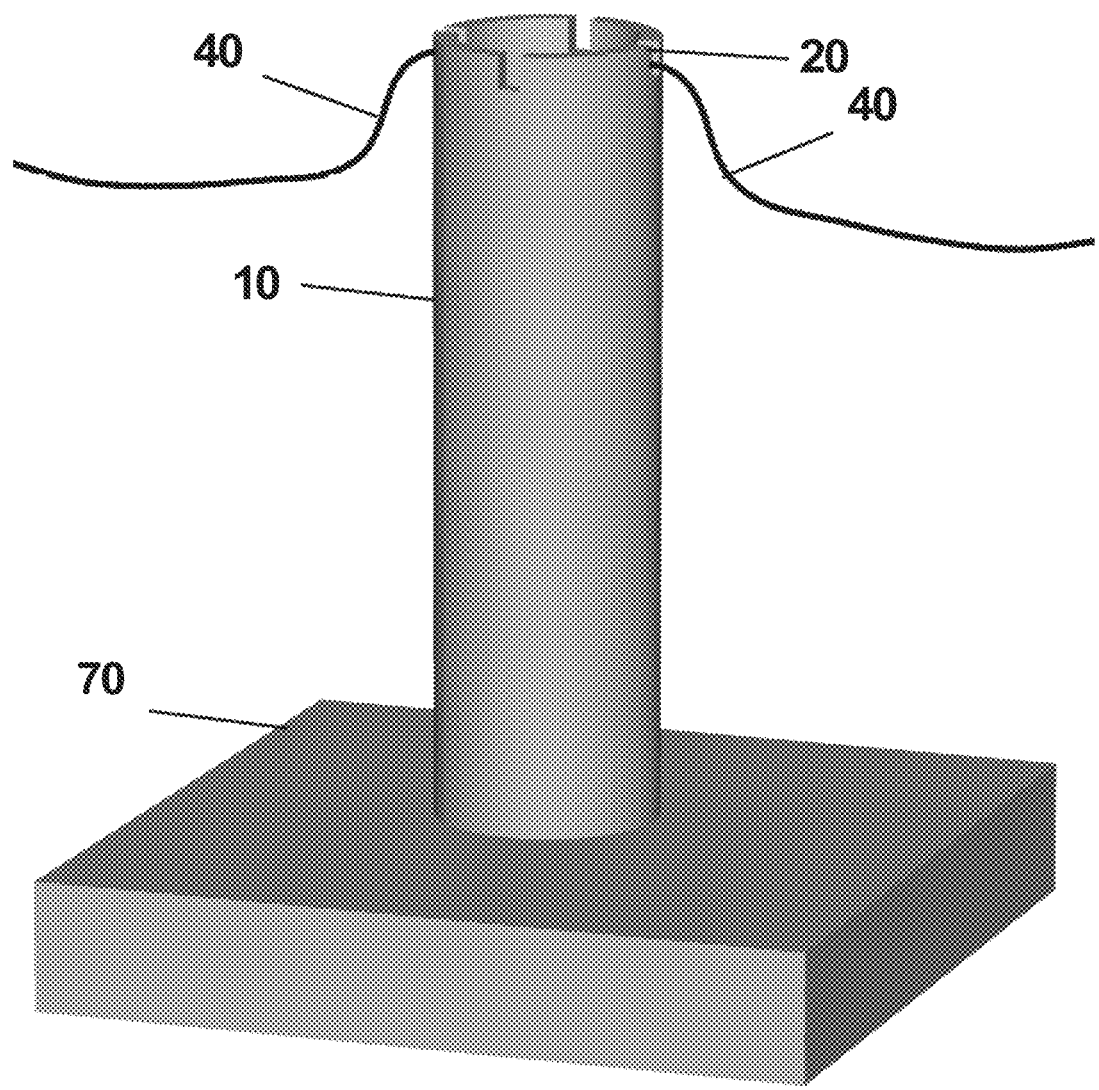
FIG. 4 shows the watering device in accordance with a third embodiment.

FIG. 4 shows a third embodiment with the tube (10), optional notches (20), at least one wick (40) with a bottom plate (70) substituted for the extension shown in embodiment 2. In use, a reservoir is inserted into the tube.

Figure 5:
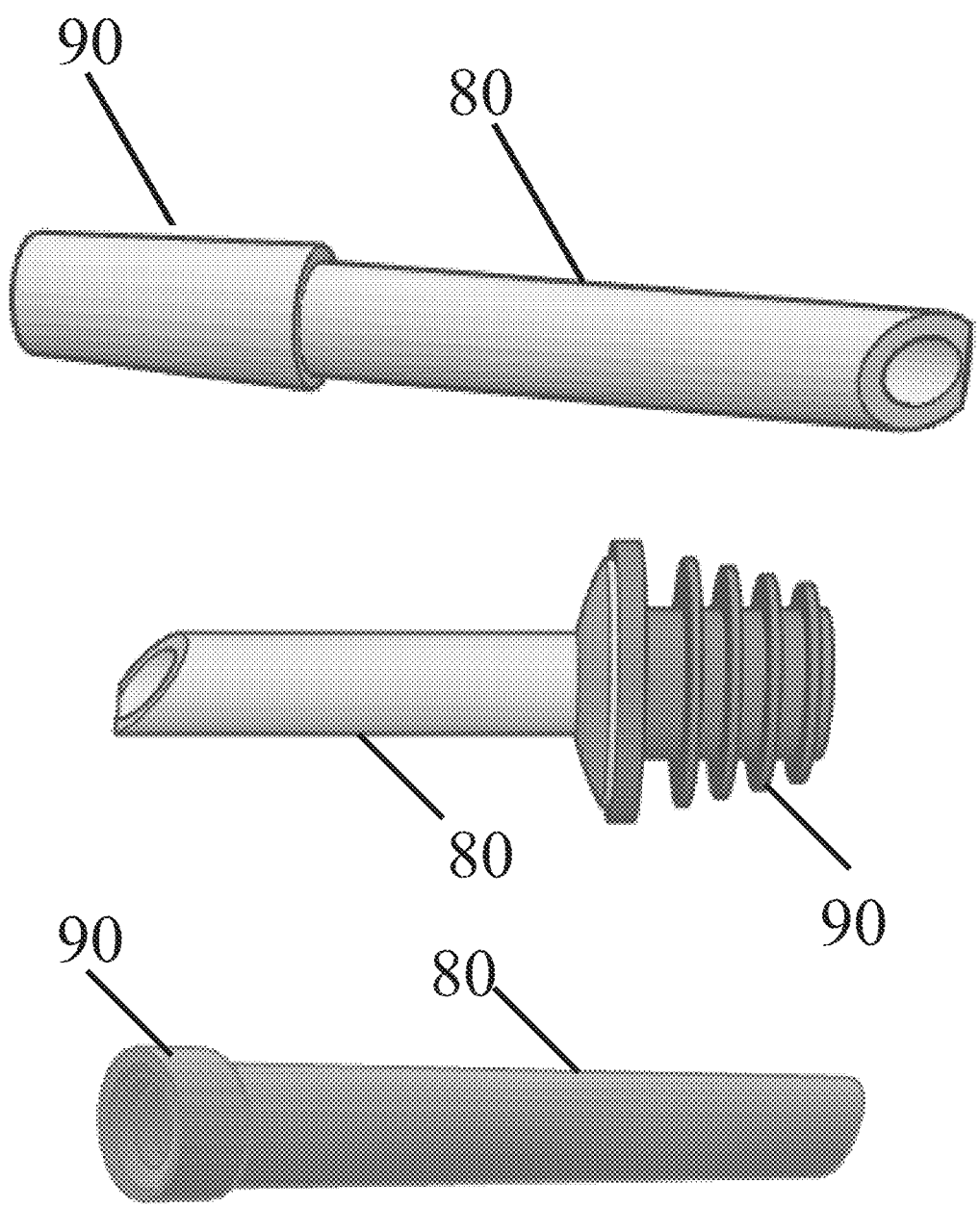
FIG. 5 shows prior art tips that can be attached to a bottle to form a reservoir.

FIG. 5 shows types of prior art tips (80) that can be attached to bottle by insertion into the mouth of the bottle, insertion of the bottle's mouth into the tip housing, threading the bottle mouth into the tip or other means (90) in order to convert it into a reservoir for plant nourishment.

The construction materials and dimensions of the tube (10), extension (30), retaining device (50), wicks(s) (40) and plate (70) can be varied, the requirements being that they be insoluble in the liquids used to nourish the plants and structurally strong enough to support a filled watering globe or other reservoir. The upper, open portion can be manufactured with varying depths or diameters to accommodate watering globes of different dimensions. Typical depths of this portion are 50 mm to 150 mm and diameters are typically 10 mm to 30 mm. The extension (30) that provides stability and support for the watering globe is typically 40 mm to 150 mm long and typically tapered for ease of insertion into the plant medium. The bottom plate is typically 5 mm to 20 mm thick and its area is typically four to ten times the cross sectional area of the tube (10).

I claim:

1. A plant watering device to be inserted into the top surface of a plant growth medium comprising:
    a) a hollow tube being an elongated unit open at its upper end and completely closed below, impervious to aqueous solutions, allowing the open upper end of the hollow tube to receive the discharge of a separate and removable reservoir of liquid having an opening at its lower end and being otherwise hermetic,
    b) at least one wick or capillary exiting the open upper end of said tube above the top of said plant growth medium and connecting said tube and said plant growth medium to draw said liquid from said reservoir into said plant growth medium, thereby watering a plant.

2. The device, according to claim 1, where said tube has at least one extension from its lower end into said plant growth medium.

3. The device, according to claim 1, where said tube has a plate formed near its lower end having a top surface area at least twice the cross sectional area of said tube.

4. The device, according to claim 1, where the ratio of the depth of the hollow tube to said tube's maximum diameter is greater than three.

5. The device, according to claim 1, where said tube contains a plurality of said wicks or capillaries.

6. The device, according to claim 1, where said wicks or capillaries are attached to a retention device or structure inserted within said tube.

7. The device, according to claim 1, where said tube has at least one notch around its upper end.

8. The device, according to claim 1, where the body of said tube is approximately cylindrical.

9. The device, according to claim 1, where the inside diameter of said hollow tube is 10 mm to 30 mm.

10. The device, according to claim 1, where the depth of the hollow tube is 50 mm to 150 mm.

11. The device, according to claim 1, where at least one wick or capillary passes through an impervious sleeve after leaving the tube.

12. The device, according to claim 2, where said extension is tapered.

13. The device, according to claim 2, where said extension is 40 mm to 150 mm long.

14. A method for distributing a liquid to a plant, comprising:
    a) providing a plant disposed in a container of plant growth medium and a separate and removable reservoir of liquid plant nutrient having an opening at its lower end and being otherwise hermetic,
    b) providing an elongated hollow tube device having an open upper end and being completely closed below and impervious to aqueous solution placed in situ within said container with the open upper end of the tube above said plant growth medium to accept said reservoir and having at least one wick or capillary exiting said tube through the open upper end as a means of passively conveying said liquid to said plant growth medium, and
    c) inserting the open end of said reservoir into said tube device, providing liquid nourishment to said plant growth medium from said reservoir, whereby said liquid is conveyed to said plant growth medium.

* * * * *